(12) United States Patent
Givon (10) Patent No.: US 8,432,390 B2
(45) Date of Patent: Apr. 30, 2013

(54) APPARATUS SYSTEM AND METHOD FOR HUMAN-MACHINE INTERFACE

(75) Inventor: Dor Givon, Tel Aviv (IL)

(73) Assignee: Extreme Reality Ltd, Herzliya (IL)

( * ) Notice: Subject to any disclaimer, the term of this patent is extended or adjusted under 35 U.S.C. 154(b) by 691 days.

(21) Appl. No.: 12/517,210

(22) PCT Filed: Apr. 15, 2007

(86) PCT No.: PCT/IL2007/000475
§ 371 (c)(1),
(2), (4) Date: Jun. 2, 2009

(87) PCT Pub. No.: WO2008/126069
PCT Pub. Date: Oct. 23, 2008

(65) Prior Publication Data
US 2010/0066735 A1   Mar. 18, 2010

Related U.S. Application Data

(63) Continuation-in-part of application No. 11/572,958, filed as application No. PCT/IL2005/000813 on Jul. 31, 2005, now Pat. No. 8,114,172, application No. 12/517,210, which is a continuation-in-part of application No. PCT/IL2006/001254, filed on Oct. 31, 2006.

(60) Provisional application No. 60/592,136, filed on Jul. 30, 2004, provisional application No. 60/731,274, filed on Oct. 31, 2005.

(51) Int. Cl.
*G06T 15/00*   (2011.01)

(52) U.S. Cl.
USPC ........... 345/419; 345/418; 345/426; 345/427; 345/473; 348/42; 348/169; 382/107; 382/154; 382/285

(58) Field of Classification Search ................. 345/419, 345/426, 427, 473, 418; 382/154, 177; 348/42, 348/169
See application file for complete search history.

(56) References Cited

U.S. PATENT DOCUMENTS

| | | | |
|---|---|---|---|
| 5,691,885 A * | 11/1997 | Ward et al. ..................... | 361/735 |
| 6,115,482 A * | 9/2000 | Sears et al. ..................... | 382/114 |
| 6,833,843 B2 | 12/2004 | Mojaver et al. | |
| 7,257,237 B1 * | 8/2007 | Luck et al. .................... | 382/103 |
| 2004/0155962 A1 | 8/2004 | Marks | |
| 2006/0187305 A1 * | 8/2006 | Trivedi et al. ................. | 348/169 |
| 2007/0098250 A1 * | 5/2007 | Molgaard et al. ............. | 382/154 |

FOREIGN PATENT DOCUMENTS

| WO | WO 2004/094943 | 11/2004 |
|---|---|---|
| WO | WO 2006/099597 | 9/2006 |

OTHER PUBLICATIONS

Sminchisescu et al. "Estimating Articulated Human Motion With Covariance Scaled Sampling". Published 2003.*

(Continued)

*Primary Examiner* — Kimbinh T Nguyen
(74) *Attorney, Agent, or Firm* — Vladimir Sherman; Professional Patent Solutions (57) ABSTRACT

There is provided a 3D human machine interface ("3D HMI"), which 3D HMI may include: (1) an image acquisition assembly, (2) an initializing module, (3) an image segmentation module, (4) a segmented data processing module, (5) a scoring module, (6) a projection module, (7) a fitting module, (8) a scoring and error detection module, (9) a recovery module, (10) a three dimensional correlation module, (11) a three dimensional skeleton prediction module, (12) an output module and (13) a depth extraction module.

19 Claims, 6 Drawing Sheets

OTHER PUBLICATIONS

Sappa et al. "Monocular 3D Human body Reconstruction toward Depth Augmentation of Television Sequences". Published 2003.*
Sminchisescu et al. "Human Pose Estimation from Silhouettes A Consistent Approach Using Distance Level Set". Published 2002.*

Notice of Rejection and English Summary (Translation), issued Jun. 10, 2011, in co-pending Japanese Application; JP 2010-502633.
International Search Report and Written Opinion Issued in PCT/IL2007/000475.

* cited by examiner

APPARATUS SYSTEM AND METHOD FOR HUMAN-MACHINE INTERFACE

RELATED APPLICATIONS

The present application is a 371 National Stage Application of PCT Application PCT/IL2007/000475 filed Apr. 15, 2007.

The present application is a continuation-in-part of U.S. patent application Ser. No. 11/572,958 filed Jan. 30, 2007, U.S. Pat. No. 8,114,172, which is a 371 National Stage Application of PCT Application PCT/IL2005/000813 filed Jul. 31, 2005, which claim the benefit of U.S. 60/592,136, filed Jul. 30, 2004.

The present application is a continuation-in-part of PCT Application PCT/IL2006/001254 filed Oct. 31, 2006, which claims the benefit of U.S. 60/731,274, filed Oct. 31, 2005.

Each of the aforementioned applications is hereby incorporated by reference in its entirety.

FIELD OF THE INVENTION

The present invention generally relates to user interfaces and more particularly to methods and systems of 3D Human-Machine-Interface.

BACKGROUND OF THE INVENTION

One of the largest patterns in the history of software is the shift from computation-intensive design to presentation-intensive design. As machines have become more and more powerful, inventors have spent a steadily increasing fraction of that power on presentation. The history of that progression can be conveniently broken into three eras: batch (1945-1968), command-line (1969-1983) and graphical (1984 and after). The story begins, of course, with the invention of the digital computer. The opening dates on the latter two eras are the years when vital new interface technologies broke out of the laboratory and began to transform users' expectations about interfaces in a serious way. Those technologies were interactive timesharing and the graphical user interface.

In the batch era, computing power was extremely scarce and expensive. The largest computers of that time commanded fewer logic cycles per second than a typical toaster or microwave oven does today, and quite a bit fewer than today's cars, digital watches, or cellphones. User interfaces were, accordingly, rudimentary. Users had to accommodate computers rather than the other way around; user interfaces were considered overhead, and software was designed to keep the processor at maximum utilization with as little overhead as possible.

The input side of the user interfaces for batch machines were mainly punched cards or equivalent media like paper tape. The output side added line printers to these media. With the limited exception of the system operator's console, human beings did not interact with batch machines in real time at all.

Submitting a job to a batch machine involved, first, preparing a deck of punched cards describing a program and a dataset. Punching the program cards wasn't done on the computer itself, but on specialized typewriter-like machines that were notoriously balky, unforgiving, and prone to mechanical failure. The software interface was similarly unforgiving, with very strict syntaxes meant to be parsed by the smallest possible compilers and interpreters.

Once the cards were punched, one would drop them in a job queue and wait. Eventually, operators would feed the deck to the computer, perhaps mounting magnetic tapes to supply another dataset or helper software. The job would generate a printout, containing final results or (all too often) an abort notice with an attached error log. Successful runs might also write a result on magnetic tape or generate some data cards to be used in later computation.

The turnaround time for a single job often spanned entire days. If one were very lucky, it might be hours; real-time response was unheard of. But there were worse fates than the card queue; some computers actually required an even more tedious and error-prone process of toggling in programs in binary code using console switches. The very earliest machines actually had to be partly rewired to incorporate program logic into themselves, using devices known as plugboards.

Early batch systems gave the currently running job the entire computer; program decks and tapes had to include what we would now think of as operating-system code to talk to I/O devices and do whatever other housekeeping was needed. Midway through the batch period, after 1957, various groups began to experiment with so-called "load-and-go" systems. These used a monitor program which was always resident on the computer. Programs could call the monitor for services. Another function of the monitor was to do better error checking on submitted jobs, catching errors earlier and more intelligently and generating more useful feedback to the users. Thus, monitors represented a first step towards both operating systems and explicitly designed user interfaces.

Command-line interfaces (CLIs) evolved from batch monitors connected to the system console. Their interaction model was a series of request-response transactions, with requests expressed as textual commands in a specialized vocabulary. Latency was far lower than for batch systems, dropping from days or hours to seconds. Accordingly, command-line systems allowed the user to change his or her mind about later stages of the transaction in response to real-time or near-real-time feedback on earlier results. Software could be exploratory and interactive in ways not possible before. But these interfaces still placed a relatively heavy mnemonic load on the user, requiring a serious investment of effort and learning time to master.

Command-line interfaces were closely associated with the rise of timesharing computers. The concept of timesharing dates back to the 1950s; the most influential early experiment was the MULTICS operating system after 1965; and by far the most influential of present-day command-line interfaces is that of Unix itself, which dates from 1969 and has exerted a shaping influence on most of what came after it.

The earliest command-line systems combined teletypes with computers, adapting a mature technology that had proven effective for mediating the transfer of information over wires between human beings. Teletypes had originally been invented as devices for automatic telegraph transmission and reception; they had a history going back to 1902 and had already become well-established in newsrooms and elsewhere by 1920. In reusing them, economy was certainly a consideration, but psychology and the Rule of Least Surprise mattered as well; teletypes provided a point of interface with the system that was familiar to many engineers and users.

The widespread adoption of video-display terminals (VDTs) in the mid-1970s ushered in the second phase of command-line systems. These cut latency further, because characters could be thrown on the phosphor dots of a screen more quickly than a printer head or carriage can move. They helped quell conservative resistance to interactive programming by cutting ink and paper consumables out of the cost picture, and were to the first TV generation of the late 1950s and 60s even more iconic and comfortable than teletypes had been to the computer pioneers of the 1940s.

Just as importantly, the existence of an accessible screen, a two-dimensional display of text that could be rapidly and reversibly modified made it economical for software designers to deploy interfaces that could be described as visual rather than textual. The pioneering applications of this kind were computer games and text editors; close descendants of some of the earliest specimens, such as rogue(6), and vi(1), are still a live part of Unix tradition.

Screen video displays were not entirely novel, having appeared on minicomputers as early as the PDP-1 back in 1961. But until the move to VDTs attached via serial cables, each exceedingly expensive computer could support only one addressable display, on its console. Under those conditions it was difficult for any tradition of visual UI to develop; such interfaces were one-offs built only in the rare circumstances where entire computers could be at least temporarily devoted to serving a single user.

There were sporadic experiments with what we would now call a graphical user interface as far back as 1962 and the pioneering SPACEWAR game on the PDP-1. The display on that machine was not just a character terminal, but a modified oscilloscope that could be made to support vector graphics. The SPACEWAR interface, though mainly using toggle switches, also featured the first crude trackballs, custom-built by the players themselves. Ten years later, in the early 1970s these experiments spawned the video-game industry, which actually began with an attempt to produce an arcade version of SPACEWAR.

The PDP-1 console display had been descended from the radar display tubes of World War II, twenty years earlier, reflecting the fact that some key pioneers of minicomputing at MIT's Lincoln Labs were former radar technicians. Across the continent in that same year of 1962, another former radar technician was beginning to blaze a different trail at Stanford Research Institute. His name was Doug Engelbart. He had been inspired by both his personal experiences with these very early graphical displays and by Vannevar Bush's seminal essay *As We May Think*, which had presented in 1945 a vision of what we would today call hypertext.

In December 1968, Engelbart and his team from SRI gave a 90-minute public demonstration of the first hypertext system, NLS/Augment. The demonstration included the debut of the three-button mouse (Engelbart's invention), graphical displays with a multiple-window interface, hyperlinks, and on-screen video conferencing. This demo was a sensation with consequences that would reverberate through computer science for a quarter century, up to and including the invention of the World Wide Web in 1991.

So, as early as the 1960s it was already well understood that graphical presentation could make for a compelling user experience. Pointing devices equivalent to the mouse had already been invented, and many mainframes of the later 1960s had display capabilities comparable to those of the PDP-1. A very early video game in 1968, on the console of a Univac 1108 mainframe would cost nearly forty-five million dollars if you could buy it in 2004.

Video games became mass-market devices earlier than computers because they ran hardwired programs on extremely cheap and simple processors. But on general-purpose computers, oscilloscope displays became an evolutionary dead end. The concept of using graphical, visual interfaces for normal interaction with a computer had to wait a few years and was actually ushered in by advanced graphics-capable versions of the serial-line character VDT in the late 1970s.

Since the earliest PARC systems in the 1970s, the design of GUIs has been almost completely dominated by what has come to be called the WIMP (Windows, Icons, Mice, Pointer) model pioneered by the Alto. Considering the immense changes is in computing and display hardware over the ensuing decades, it has proven surprisingly difficult to think beyond the WIMP.

A few attempts have been made. Perhaps the boldest is in VR (virtual reality) interfaces, in which users move around and gesture within immersive graphical 3-D environments. VR has attracted a large research community since the mid-1980s. A fundamental problem, familiar for many years to designers of flight simulators, is the way VR can confuse the human proprioceptive system; VR motion at even moderate speeds can induce dizziness and nausea as the brain tries to reconcile the visual simulation of motion with the inner ear's report of the body's real-world motions.

Jef Raskin's THE project (The Humane Environment) is exploring the zoom world model of GUIs, distinct in that it spatializes them without going 3D. In THE, the screen becomes a window on a 2-D virtual world where data and programs are organized by spatial locality. Objects in the world can be presented at several levels of detail depending on one's height above the reference plane, and the most basic selection operation is to zoom in and land on them.

The Lifestreams project at Yale University goes in a completely opposite direction, actually de-spatializing the GUI. The user's documents are presented as a kind of world-line or temporal stream which is organized by modification date and can be filtered in various ways.

All three of these approaches discard conventional filesystems in favor of a context that tries to avoid naming things and using names as the main form of reference. This makes them difficult to match with the filesystems and hierarchical namespaces of Unix's architecture, which seems to be one of its most enduring and effective features. Nevertheless, it is possible that one of these early experiments may yet prove as seminal as Engelbart's 1968 demo of NLS/Augment.

There is a need in the field of user interfaces for an improved system and method of a Human-Machine-Interface.

SUMMARY OF THE INVENTION

According to some embodiments of the present invention, there is provided a 3D human machine interface ("3D HMI"), which 3D HMI may include (1) an image acquisition assembly, (2) an initializing module, (3) an image segmentation module, (4) a segmented data processing module, (5) a scoring module, (6) a projection module, (7) a fitting module, (8) a scoring and error detection module, (9) a recovery module, (10) a three dimensional correlation module, (11) a three dimensional skeleton prediction module, and (12) an output module.

According to some embodiments of the present invention, the image acquisition assembly may be adapted to acquire a set of images, wherein substantially each image is associated with a different point in time. According to some further embodiments of the present invention, the images may be of a single user or multiple users.

According to some embodiments of the present invention, the initialization module may be adapted to detect and define the user's (1) colors, (2) organ parameters, (3) surroundings, and (4) other parameters which are associated with the user.

According to some embodiments of the present invention, the user may be any person and/or animal and/or moving object which enters the frame.

According to some embodiments of the present invention, the image segmentation module may be adapted to extract segmented data from the image. According to yet further embodiments of the present invention, the segmented data may also comprise:
  Color
  Movement
  Edge detection
  Texture.

According to some embodiments of the present invention, the segmented data processing module may be adapted to process the segmented data. According to yet further embodiments of the present invention, the segmented data may be processed in the following way:
  Color—using known color parameters to detect elements and/or light changes, for example, using skin color to detect palms and face.
  Movement—detecting moving elements in the frame.
  Background removal.
  Edge detection—detect the edges of the image.
  Texture—using known texture parameters to detect elements.

According to some embodiments of the present invention, the segmented data processing module may be adapted to detect deviation in the distance of an organ from the image acquisition assembly, in accordance with the deviation of the organs relative size.

According to some embodiments of the present invention, the scoring module may be adapted to (1) examine the processed segmented data, (2) estimate the quality of the processed segmented data, and according to the quality (3) decide which portions of the segmented data are reliable enough to be used by the HMI system.

According to some embodiments of the present invention, the three dimensional skeleton prediction module may be adapted to predict the position of the three dimensional skeleton which will have the best match or correlation with the processed image.

According to further embodiments of the present invention, the three dimensional prediction module may use constraints which derive from the type of skeleton used, for example, if the skeleton is of a human figure, the head of the skeleton can't rotate 360 degrees.

According to yet further embodiments of the present invention, the three dimensional prediction module may also use a set of dynamic and motion processes to predict the position of the three dimensional skeleton.

According to some embodiments of the present invention, the projection module may be adapted to project the skeleton onto the image. According to some further embodiments of the present invention, the projection may be applied in a two-dimensional plane.

According to some embodiments of the present invention, the fitting module may be adapted to fit segmented data to the projected skeleton. According to some further embodiments of the present invention, the fitting module may be adapted to associate portions of the segmented data with portions of the projected skeleton.

According to some embodiments of the present invention, the scoring and error detection module may be adapted: (1) to examine the processed skeleton after it was associated with segmented data, (2) to evaluate the fitting quality of said skeleton and (3) determine whether an error has occurred during the skeleton prediction process or the association of segmented data.

According to some embodiments of the present invention, the recovery module may be adapted to recover from a detected error. According to some further embodiments of the present invention, the recovery may be a process of multiple processing layers, resegmenting the image, using the 3D skeleton motion history to repredict the correct position, reprojecting and refitting the 3D skeleton. The recovery module may also decide to skip a frame if the image information is corrupt.

According to some embodiments of the present invention, the three dimensional correlation module may be adapted to update the position of the three dimensional skeleton in accordance with the position of the fitted skeleton.

According to some further embodiments of the present invention, said updating process associates the 3D skeleton on the fitted skeleton, fits between the 3D skeleton and the fitted skeleton, and updates the 3D skeleton to the correct position.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

According to some embodiments of the present invention, there is provided a 3D human machine interface ("3D HMI"), which 3D HMI may include: (1) an image acquisition assembly, (2) an initializing module, (3) an image segmentation module, (4) a segmented data processing module, (5) a scoring module, (6) a projection module, (7) a fitting module, (8) a scoring and error detection module, (9) a recovery module, (10) a three dimensional correlation module, (11) a three dimensional skeleton prediction module, and (12) an output module.

According to some embodiments of the present invention, the image acquisition assembly may be adapted to acquire a set of images, wherein substantially each image is associated with a different point in time. According to some further embodiments of the present invention, the images may be of a single user or multiple users.

According to some embodiments of the present invention, the initialization module may be adapted to detect and define the user's: (1) colors, (2) organ parameters, (3) surroundings, and (4) other parameters which are associated with the user, and decide on the best way for image segmentation in the next steps (thresholds, score for every image segmentation, etc.)

According to some embodiments of the present invention, the image segmentation module may be adapted to extract segmented data from the image. According to yet further embodiments of the present invention, the segmented data may also comprise:
  Color
  Movement
  Edge detection
  Texture.

According to some embodiments of the present invention, the segmented data processing module may be adapted to process the segmented data. According to yet further embodiments of the present invention, the segmented data may be processed in the following way:
  Color—using known color parameters to detect elements and/or light changes, for example, using skin color to detect palms and face.
  Movement—detecting moving elements in the frame.
  Background removal.
  Edge detection—detect the edges of the image.
  Texture—using known texture parameters to detect elements.

According to some embodiments of the present invention, the scoring module may be adapted to: (1) examine the processed segmented data, (2) estimate the quality of the processed segmented data, and according to the quality (3) decide which portions of the segmented data are reliable enough to be used by the HMI system.

According to some embodiments of the present invention, the three dimensional skeleton prediction module may be adapted to predict the position of the three dimensional skeleton which will have the best match or correlation with the processed image.

According to further embodiments of the present invention, the three dimensional prediction module may use constraints which derive from the type of skeleton used, for example, if the skeleton is of a human figure, the head of the skeleton can't rotate 360 degrees.

According to yet further embodiments of the present invention, the three dimensional prediction module may use a set of dynamic and motion processes to predict the position of the three dimensional skeleton.

According to some embodiments of the present invention, the projection module may be adapted to project the skeleton onto the image. According to some further embodiments of the present invention, the projection may be applied in the two-dimensional plane.

According to some embodiments of the present invention, the fitting module may be adapted to fit segmented data to the projected skeleton. According to some further embodiments of the present invention, the fitting module may be adapted to associate portions of the segmented data with portions of the projected skeleton.

According to some embodiments of the present invention, the scoring and error detection module may be adapted: (1) to examine the processed skeleton after it was associated with segmented data, (2) to evaluate the fitting quality of said skeleton and (3) determine whether an error has occurred during the skeleton prediction process or the association of segmented data.

According to some embodiments of the present invention, the recovery module may be adapted to recover from a detected error. According to some further embodiments of the present invention, the recovery may be a process of multiple processing layers, resegmenting the image, using the 3D skeleton motion history to repredict the correct position, reprojecting and refitting the 3D skeleton. The recovery module may also decide to skip a frame if the image information is corrupt.

According to some embodiments of the present invention, the three dimensional correlation module may be adapted to update the position of the three dimensional skeleton in accordance with the position of the fitted skeleton.

According to some further embodiments of the present invention, said updating process associates the 3D skeleton on the fitted skeleton, fits between the 3D skeleton and the fitted skeleton, and updates the 3D skeleton to the correct position.

Figure 1:
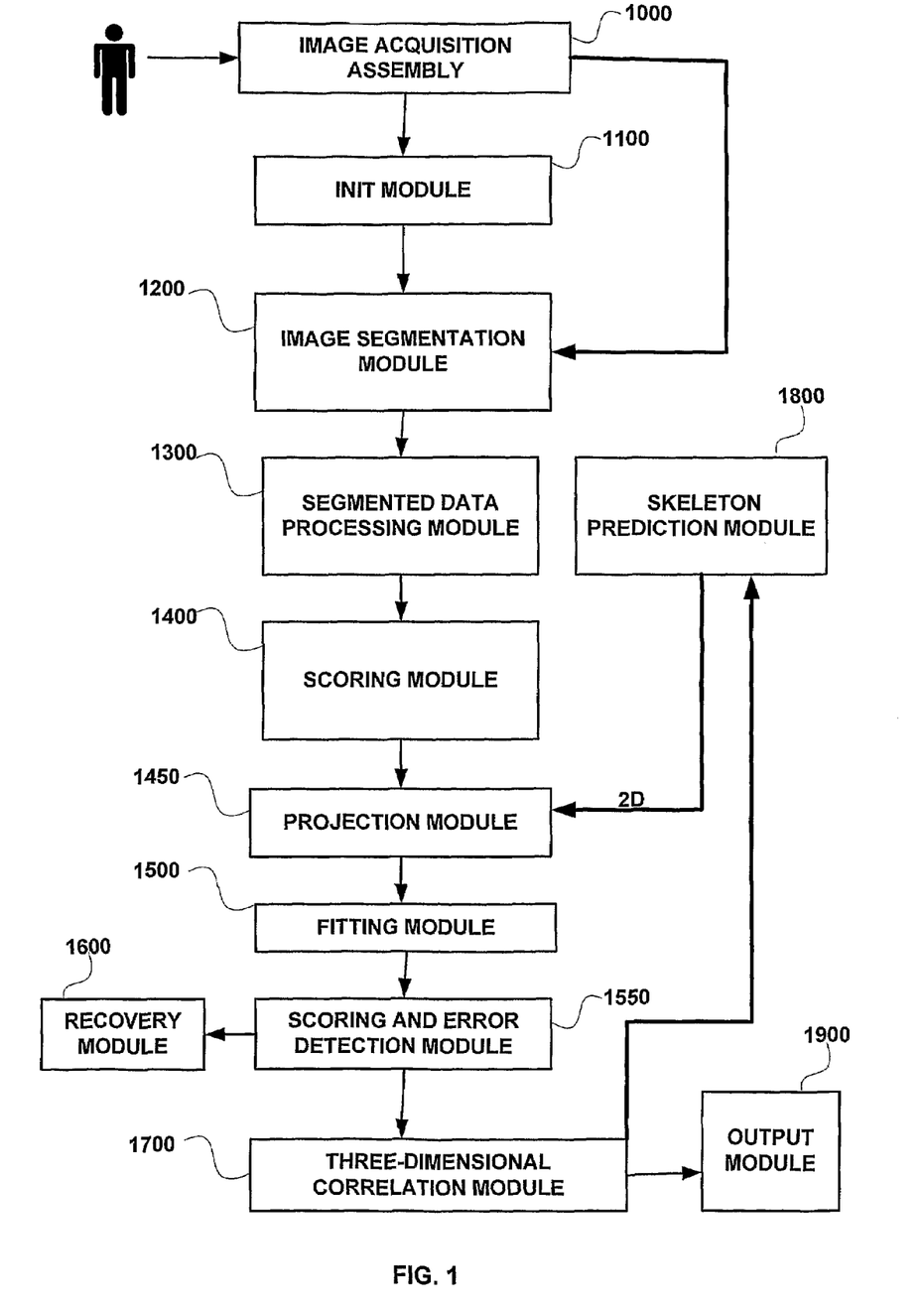
FIG. 1, there is shown a block diagram depicting a system in accordance with some embodiments of the present invention.
Figure 2:
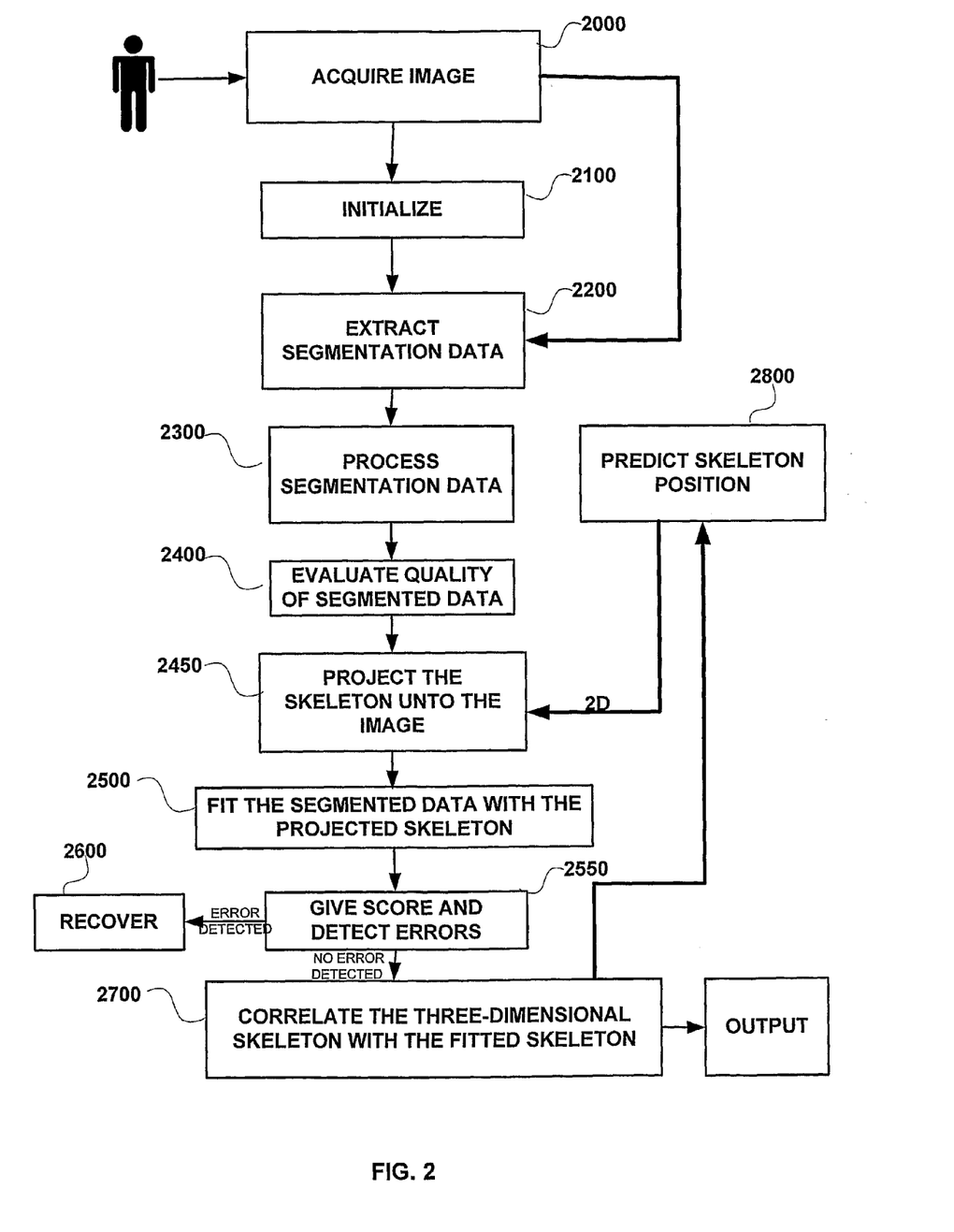
FIG. 2, there is shown a flow-chart depicting the steps of an HMI system in accordance with some embodiments of the present invention.

Turning now to FIG. 1, there is shown an exemplary HMI system in accordance with some embodiments of the present invention, which system may be best described in conjunction with FIG. 2, there is shown a flow chart depicting the steps of such an HMI system.

According to some embodiments of the present invention, FIG. 1 shows a 3D human machine interface ("3D HMI"), which 3D HMI may include: (1) an image acquisition assembly 1000, (2) an initializing module 1100, (3) an image segmentation module 1200, (4) a segmented data processing module 1300, (5) a scoring module 1400, (6) a projection module 1450, (7) a fitting module 1500, (8) a scoring and error detection module 1550, (9) a recovery module 1600, (10) a three dimensional correlation module 1700, (11) a three dimensional skeleton prediction module 1800, and (12) an output module 1900.

According to some embodiments of the present invention, the image acquisition assembly may be adapted to acquire a set of images, as seen in step 2000, wherein substantially each image is associated with a different point in time. According to some further embodiments of the present invention, the images may be of a single user or multiple users.

According to yet further embodiments of the present invention the image acquisition assembly may comprise of a digital camera, a web camera, a film' camera, a video camera, a web camera, a digital video camera, an analogue video camera, a stereo-camera and/or any other camera known today or to be devised in the future.

According to some embodiments of the present invention, after the system has acquired one or more images, the system may enter an initialization phase, step 2100, which is performed by the initialization module 1100. The initialization module may be adapted to detect and define the user's: (1) colors, (2) organ parameters, (3) surroundings, and (4) other parameters which are associated with the user.

According to some embodiments of the present invention, the system may be adapted to extract segmentation data, as shown in step 2200, which segmented data may comprise:
Color
Movement
Edge detection
Texture.

According to yet further embodiments of the present invention, the image segmentation module 1200 may be adapted to extract the segmented data from the image.

According to some embodiments of the present invention, the system may be adapted to process the segmented data, as shown in step 2300. According to yet further embodiments of the present invention, the segmented data may be processed in the following way:
Color—using known color parameters to detect elements and/or light changes, for example, using skin color to detect palms and face.
Movement—detecting moving elements in the frame.
Background removal.
Edge detection—detect the edges in the image.
Texture—using known texture parameters to detect elements.

According to yet further embodiments of the present invention, the segmented data processing module, 1300, may be adapted to process the segmented data.

According to some embodiments of the present invention, the system may be adapted to evaluate the quality of the segmented data, as shown in step 2400, the evaluation is performed by: (1) examining the processed segmented data, (2) estimating the quality of the processed segmented data, and according to the estimated quality (3) deciding which portions of the segmented data are reliable enough to be used by the HMI system.

According to yet further embodiments of the present invention, the scoring module 1400, may be adapted evaluate the quality of the segmented information.

According to further embodiments of the present invention, the system may be adapted to predict the position of the three dimensional skeleton, as shown in step 2800, which position will have the best match or correlation with the processed image. According to some further embodiments of the present invention, the prediction may be more accurate with the use of constraints which derive from the type of skeleton used, for example, if the skeleton is of a human figure, the head of the skeleton can't rotate 360 degrees without a motion of the shoulders.

According to some embodiments of the present invention, the prediction sequence may also use a set of dynamic and motion processes and so on.

According to some embodiments of the present invention, the three dimensional skeleton prediction module 1800 may be adapted to predict the position of the three dimensional skeleton.

According to some embodiments of the present invention, the system may be further adapted to project the skeleton onto the image, as shown in step 2450. According to some further embodiments of the present invention, the projection may be applied in the two-dimensional plane.

According to some embodiments of the present invention, the projection module, 2450, may be adapted to project the skeleton onto the image.

According to some embodiments of the present invention, the system may be further adapted to fit the segmented data with the projected skeleton, as shown in step 2500. According to some further embodiments of the present invention, the fitting process may comprise the association of portions of the segmented data with portions of the projected skeleton.

According to some embodiments of the present invention, fitting the segmented data may comprise associating portions of the extracted segmented data with current skeleton parameters, which current skeleton parameters may support the associated portions of extracted segmented data.

According to some further embodiments of the present invention, the outcome of this process is a "fitted skeleton".

According to some further embodiments of the present invention, the fitting module, 2500, may be adapted to associate the segmented data with the projected skeleton.

According to some embodiments of the present invention, the system may be further adapted to give a score to the fitted skeleton and detect errors, as shown in step 2550. According to some embodiments of the present invention, giving a score and detecting errors may comprise: (1) examining the fitted skeleton, (2) evaluating the fitting quality of said skeleton and (3) determining whether an error has occurred during the skeleton prediction process or the association of segmented data.

According to some embodiments of the present invention, the scoring and error detection module 1550, may be adapted to give scores and detect errors.

According to some embodiments of the present invention, if an error was detected during step 2550, the system may enter a recovery phase, as shown in step 2600. The recovery process may be a process of multiple processing layers.

According to some embodiments of the present invention, the recovery phase may comprise re-segmenting the image, re-predicting the 3D skeleton position, re-projecting and re-fitting the skeleton using extended effort. According to yet further embodiments of the present invention, the recovery module may also decide to skip a frame or more if the image information is corrupt.

According to some embodiments of the present invention, during recovery the system may be adapted to detect that the object it is tracking is not in the frame. According to yet further embodiments of the present invention, the system may be adapted to skip one or more frames until the object is back in the frame.

According to yet further embodiments of the present invention, the recovery phase may direct the system back to the initialization step.

According to some embodiments of the present invention, the recovery module 2600 may be adapted to perform the recovery process.

According to some embodiments of the present invention, if no error was detected during step 2550, the system may be adapted to update the position of the three dimensional skeleton in accordance with the position of the fitted skeleton, as shown in step 2700. According to some further embodiments of the present invention, the updating process may comprise: (1) projecting the 3D skeleton on the fitted skeleton, (2) associating the 3D skeleton with the fitted skeleton, and (3) updating the position of the 3D skeleton.

According to some embodiments of the present invention, the three dimensional correlation module, 1700 may be adapted to update the position of the three dimensional skeleton.

According to some embodiments of the present invention, the three-dimensional correlation module 1700 and the skeleton prediction module 1800, may use some or all of the algorithms and processes which were disclosed in PCT application serial number PCT/IL2005/000813, filed on 31 Jul. 2005, under the same assignee as the present application.

Figure 3:
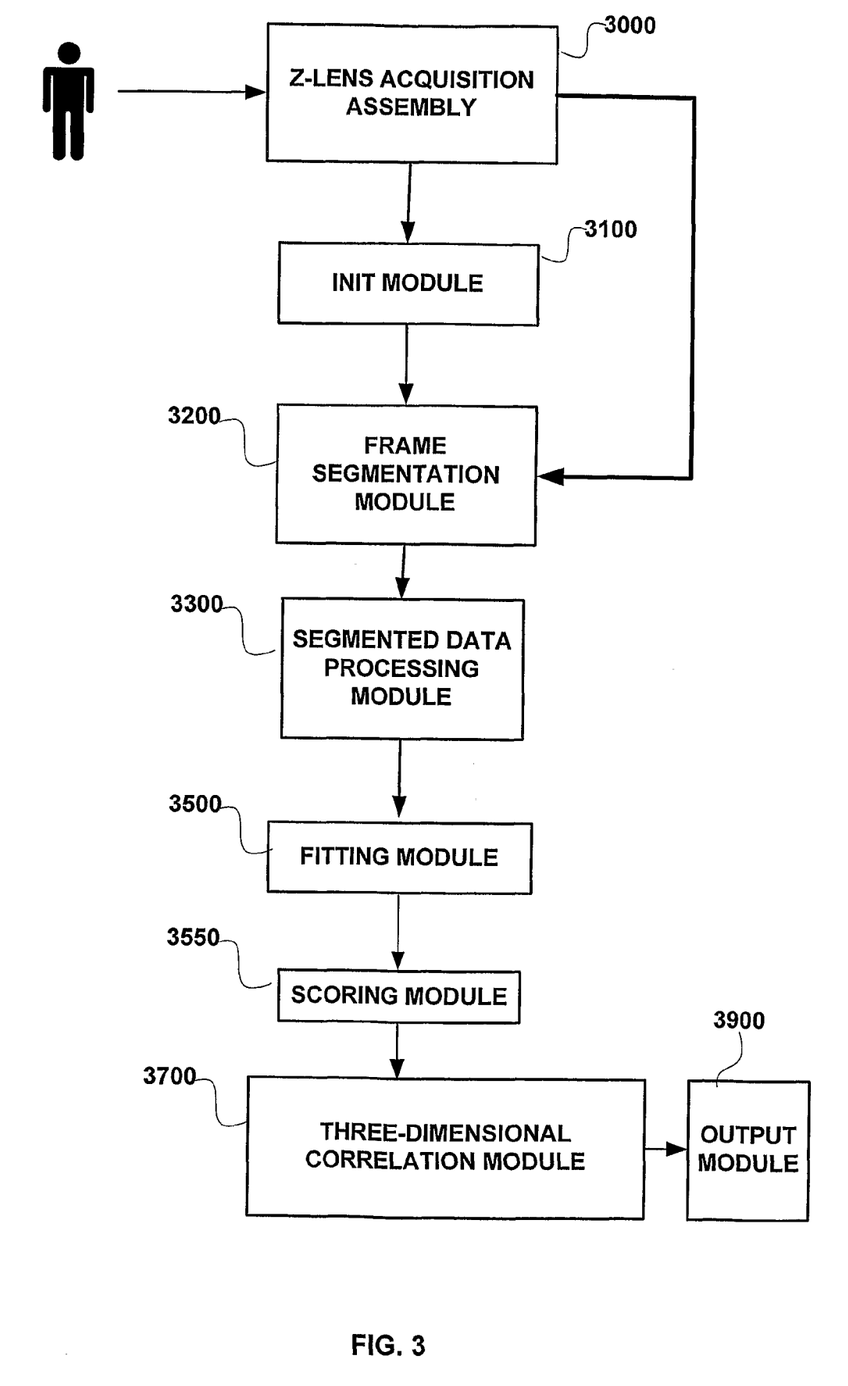
FIG. 3, there is shown a block diagram depicting a system in accordance with some embodiments of the present invention.
Figure 4:
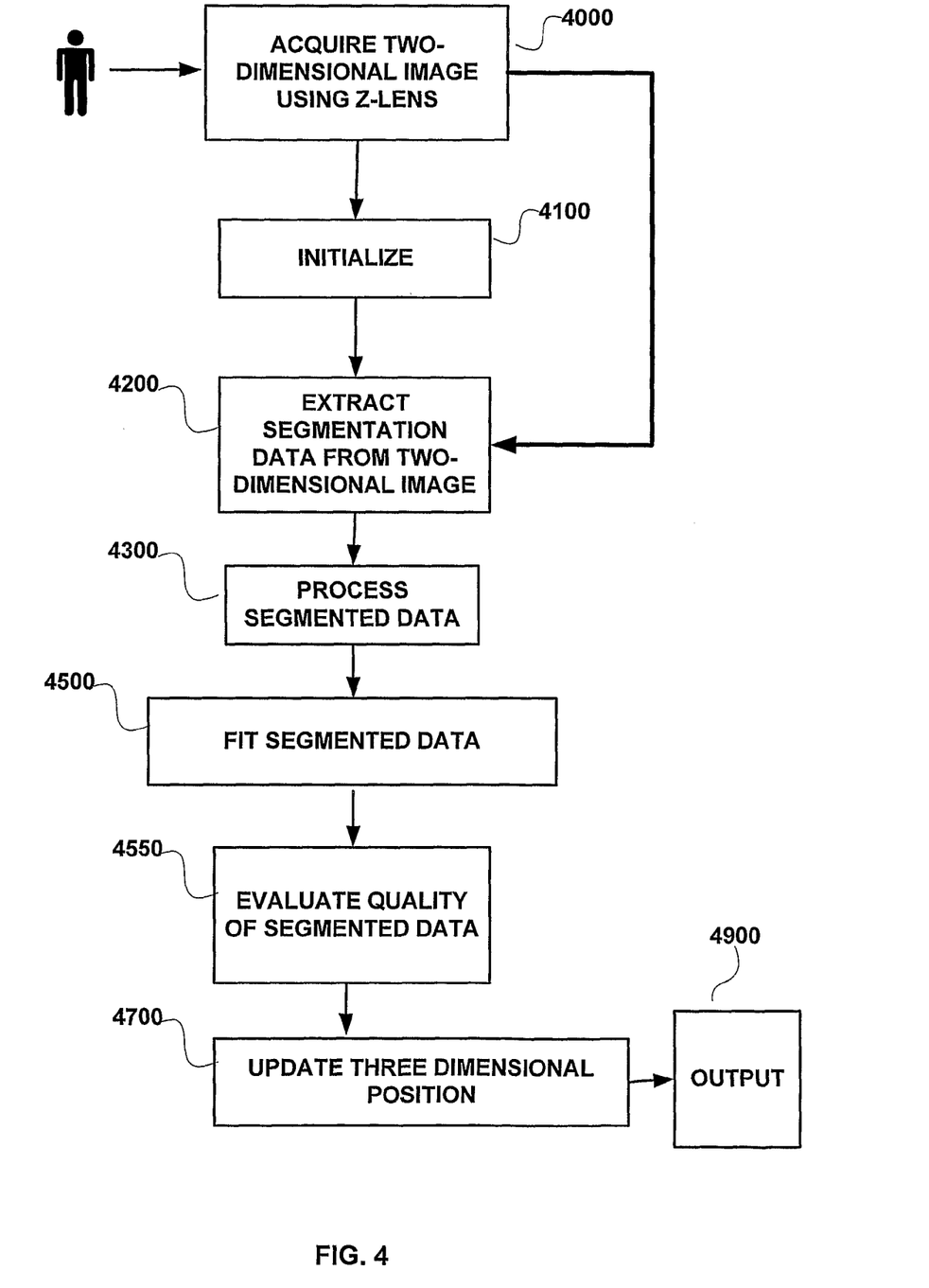
FIG. 4, there is shown a flow-chart depicting the steps of an HMI system in accordance with some embodiments of the present invention.

Turning now to FIG. 3, there is shown an exemplary HMI system in accordance with some embodiments of the present invention, which system may be best described in conjunction with FIG. 4, there is shown a flow chart depicting the steps of such an HMI system.

According to some embodiments of the present invention, FIG. 3 shows a 3D human machine interface ("3D HMI"), which 3D HMI may include (1) a Zlens image acquisition assembly 3000, (2) an initializing module 3100, (3) an image segmentation module 3200, (4) a segmented data processing module 3300, (5) a fitting module 3500, (6) a scoring module 3550, (7) a three dimensional correlation module 3700, and (8) an output module 3900.

According to some embodiments of the present invention, the Zlens acquisition assembly may be adapted to acquire a set of images, as seen in step 4000, wherein substantially each image is associated with a different point in time. According to some further embodiments of the present invention, the images may be of a single user or multiple users.

According to some embodiments of the present invention, the Zlens acquisition assembly may be mounted on another image acquisition assembly, i.e. element 1000 of FIG. 1.

According to yet further embodiments of the present invention the Zlens acquisition assembly (3000) may be best described in conjunction with PCT/IL2006/001254, filed on Oct. 31, 2006, under the same assignee as the present application and with U.S. Patent application 60/731,274 US, filed on Oct. 31, 2005, under the same assignee as the present application.

According to some embodiments of the present invention, the system is further adapted to enter an initialization phase, as shown in step 4100, which is performed by the initialization module 3100. The initialization module may be adapted to detect and define the user's: (1) colors, (2) organ parameters, (3) surroundings, and (4) other parameters which are associated with the user.

According to some embodiments of the present invention, the system may be adapted to extract segmentation data, as shown in step 4200, which segmented data may comprise:

Color
    Movement
    Edge detection
    Texture.

According to yet further embodiments of the present invention, the image segmentation module 3200 may be adapted to extract the segmented data from the image.

According to some embodiments of the present invention, the system may be adapted to process the segmented data, as shown in step 4300. According to yet further embodiments of the present invention, the segmented data may be processed in the following way:

Color—using known color parameters to detect elements and/or light changes, for example, using skin color to detect palms and face.
    Movement—detecting moving elements in the frame.
    Background removal.
    Edge detection—detect the contours of every organ.
    Texture—using known texture parameters to detect elements.

According to yet further embodiments of the present invention, the segmented data processing module, 3300, may be adapted to process the segmented data.

According to some embodiments of the present invention, the system may be further adapted to fit portions of the extracted segmented data to the acquired image, as shown in step 4500. According to some further embodiments of the present invention, the fitting process may comprise associating portions of the extracted segmented data with dedicated areas of the acquired image.

According to yet further embodiment of the present invention, the dedicated areas may be stored in the system or may be determined during the initialization phase. According to yet further embodiment of the present invention, the dedicated areas may be specific organs of the user (hands, head, feet) or any other element which may be acquired during step 3000.

According to yet further embodiment of the present invention, the fitting process may comprise testing whether the extracted segmented data defines parameters which are relevant to the dedicated areas.

According to some further embodiments of the present invention, the fitting module, 3500, may be adapted to the associate portions of the segmented data with the acquired image.

According to some further embodiments of the present invention, the outcome of this process is a "fitted image".

According to some embodiments of the present invention, the system may be further adapted to evaluate the quality of the fitted segmented data, as shown in step 4550. According to some embodiments of the present invention, evaluating the quality of the fitted segmented data may comprise: (1) examining the processed segmented data, (2) estimating the quality of the processed segmented data, and according to the estimated quality (3) deciding which portions of the segmented data are reliable enough to be used by the HMI system, (4) examining the fitted image, (5) evaluating the fitting quality of said image and (6) determining whether an error has occurred during the association of segmented data.

According to some embodiments of the present invention, the scoring module, 3550, may be adapted to evaluate the quality of the fitted segmented data.

According to some further embodiments of the present invention, the system may comprise an error detection mechanism and a recovery mechanism as was described hereinabove.

According to some embodiments of the present invention, the system may be adapted to update the position of a three dimensional body in accordance with the fitted image and the extrapolation of a depth map using the Zlens image acquisition assembly, as shown in step 4700. According to some further embodiments of the present invention, the updating process may comprise associating the extracted depth map with the extracted segmented data, and updating the position of the three-dimensional body of the output model.

According to some embodiments of the present invention, the three dimensional correlation module, 3700, may be adapted to update the position of the three dimensional body.

According to some embodiments of the present invention, the functionality of the three-dimensional correlation module 3700 and the Zlens image acquisition assembly 3000 and particularly the extrapolation of depth from an image acquired using the Zlens apparatus may best be described in conjunction with PCT/IL2006/001254, filed on Oct. 31, 2006, under the same assignee as the present application and with U.S. Patent application 60/731,274 US, filed on Oct. 31, 2005, under the same assignee as the present application.

Figure 5:
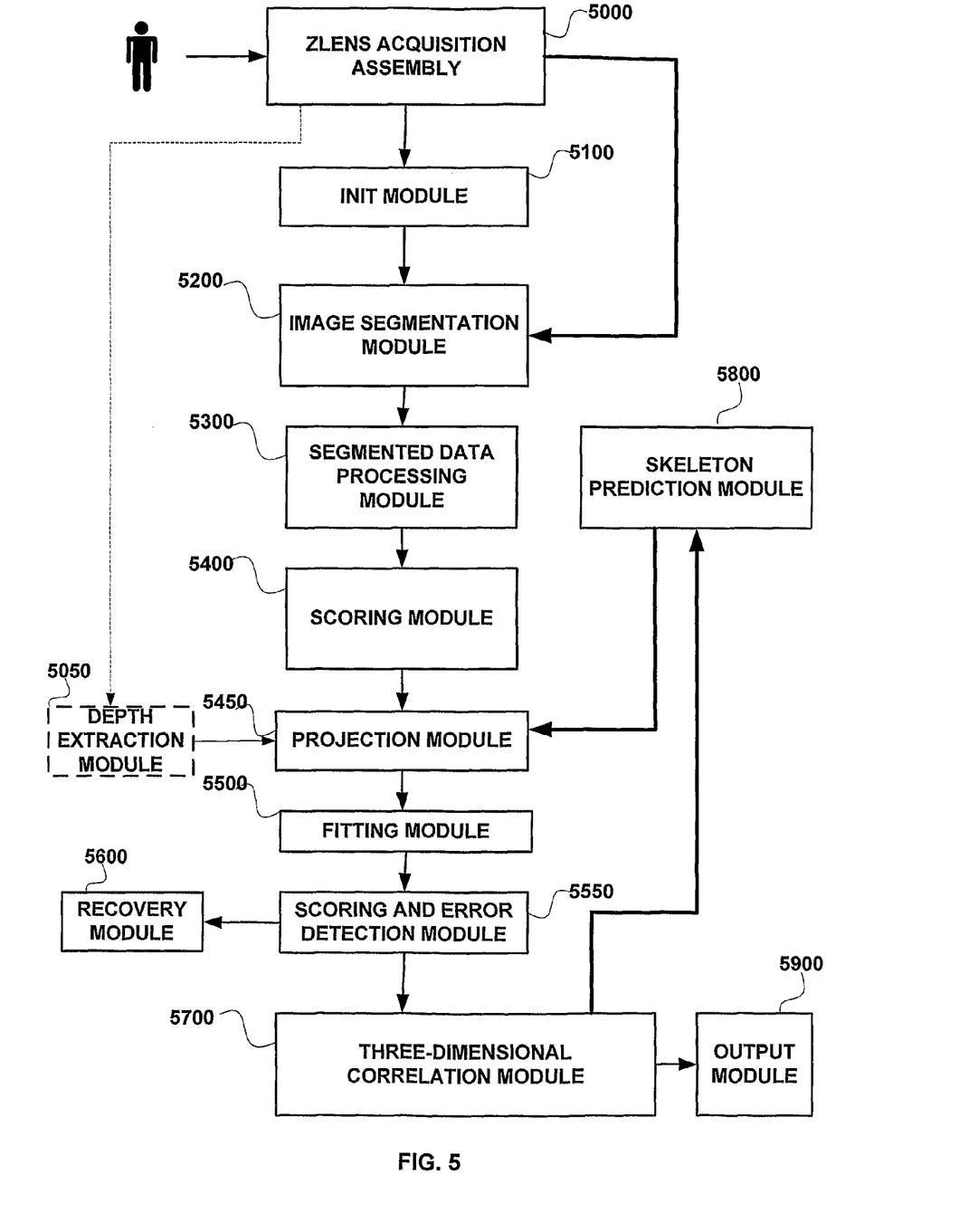
FIG. 5, there is shown a block diagram depicting a system in accordance with some embodiments of the present invention.
Figure 6:
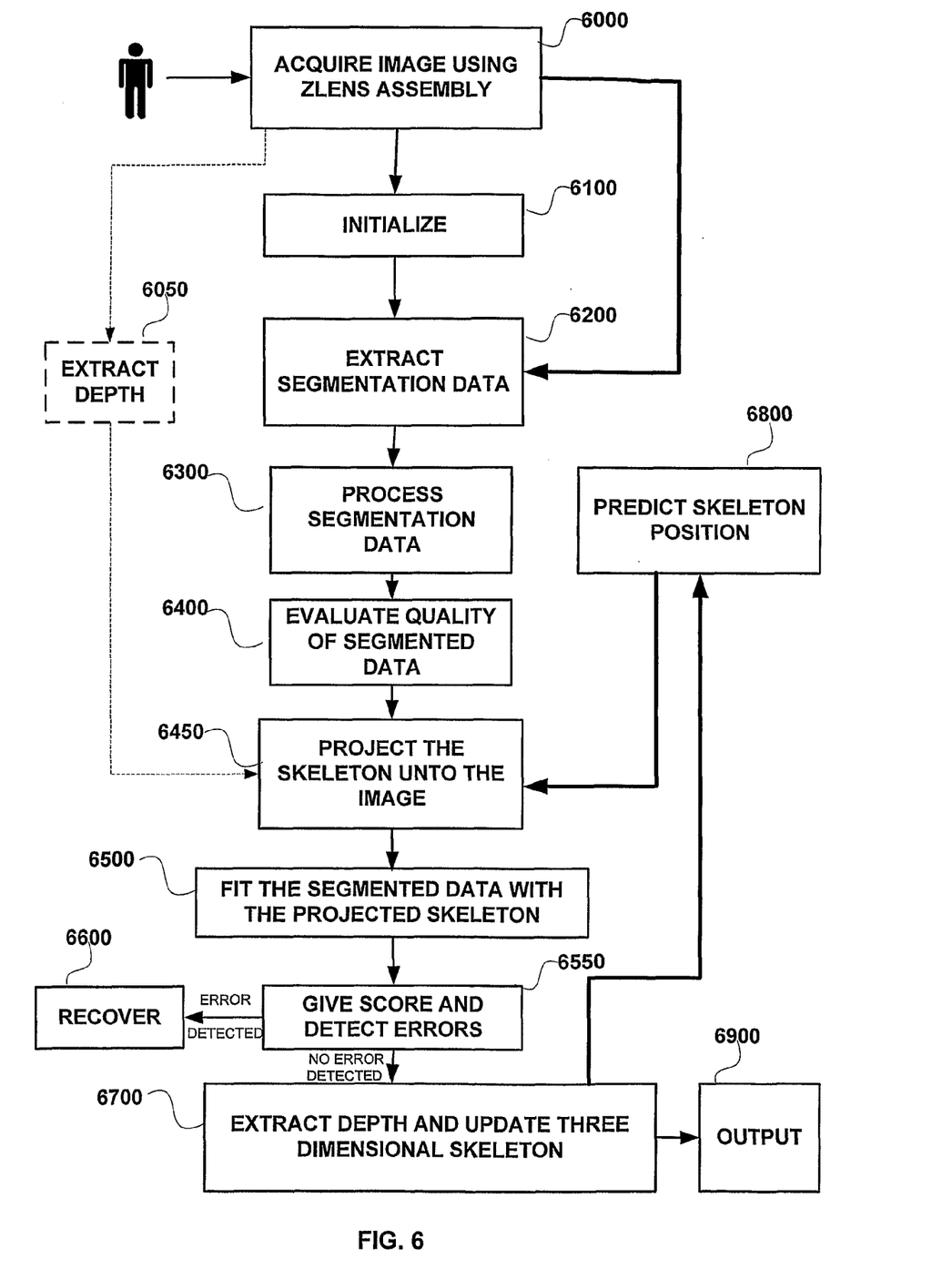
FIG. 6, there is shown a flow-chart depicting the steps of an HMI system in accordance with some embodiments of the present invention.

Turning now to FIG. 5, there is shown an exemplary HMI system in accordance with some embodiments of the present invention, which system may be best described in conjunction with FIG. 6, where there is shown a flow chart depicting the steps of such an HMI system.

According to some embodiments of the present invention, FIG. 5 shows a 3D human machine interface ("3D HMI"), which 3D HMI may include: (1) a Zlens acquisition assembly 5000, (2) an initializing module 5100, (3) an image segmentation module 5200, (4) a segmented data processing module 5300, (5) a scoring module 5400, (6) a projection module 5450, (7) a fitting module 5500, (8) a scoring and error detection module 5550, (9) a recovery module 5600, (10) a three dimensional correlation module 5700, (11) a three dimensional skeleton prediction module 5800, (12) an output module 5900 and an optional (13) depth extraction module 5050.

According to some embodiments of the present invention, the Zlens acquisition assembly may be adapted to acquire a set of images, as seen in step 6000, wherein substantially each image is associated with a different point in time. According to some further embodiments of the present invention, the images may be of a single user or multiple users.

According to some embodiments of the present invention, the Zlens acquisition assembly may be mounted on another image acquisition assembly, i.e. element 1000 of FIG. 1.

According to yet further embodiments of the present invention the Zlens acquisition assembly (5000) may be best described in conjunction with PCT/IL2006/001254, filed on Oct. 31, 2006, under the same assignee as the present application and with U.S. Patent application 60/731,274 US, filed on Oct. 31, 2005, under the same assignee as the present application.

According to some embodiments of the present invention, after the system has acquired one or more images, the system may enter an initialization phase, step 6100, which is performed by the initialization module 5100. An initialization module may be adapted to detect and define the user's: (1) colors, (2) organ parameters, (3) surroundings, and (4) other parameters which are associated with the user.

According to some embodiments of the present invention, the system may be adapted to extract segmentation data, as shown in step 6200, which segmented data may comprise:

Color
Movement
Edge detection
Texture.

According to yet further embodiments of the present invention, the image segmentation module 5200 may be adapted to extract the segmented data from the image.

According to some embodiments of the present invention, the system may be adapted to process the segmented data, as shown in step 6300. According to yet further embodiments of the present invention, the segmented data may be processed in the following way:

Color—using known color parameters to detect elements and/or light changes, for example, using skin color to detect palms and face.
Movement—detecting moving elements in the frame.
Background removal.
Edge detection—detect the contours of every organ.
Texture—using known texture parameters to detect elements.

According to yet further embodiments of the present invention, the segmented data processing module, 5300, may be adapted to process the segmented data.

According to some embodiments of the present invention, the system may be adapted to evaluate the quality of the segmented data, as shown in step 6400, the evaluation is performed by: (1) examining the processed segmented data, (2) estimating the quality of the processed segmented data, and according to the estimated quality (3) deciding which portions of the segmented data are reliable enough to be used by the HMI system.

According to yet further embodiments of the present invention, the scoring module, 5400, may be adapted evaluate the quality of the segmented information.

According to further embodiments of the present invention, the system may be adapted to predict the position of the three dimensional skeleton, as shown in step 6800, which position will have the best match or correlation with the processed image. According to some further embodiments of the present invention the prediction may be more accurate with the use of constraints which derive from the type of skeleton used, for example, if the skeleton is of a human figure, the head of the skeleton can't rotate 360 degrees without a motion of the shoulders.

According to some embodiments of the present invention, the prediction sequence may also use a set of dynamic and motion process.

According to some embodiments of the present invention, the three dimensional skeleton prediction module 5800 may be adapted to predict the position of the three dimensional skeleton.

According to some embodiments of the present invention, the system may be further adapted to extract depth using the Zlens acquisition assembly, as shown in step 6050, the extraction of depth using a Zlens acquisition assembly is described in: (1) PCT/IL2006/001254, filed on Oct. 31, 2006, under the same assignee as the present application and with (2) U.S. Patent application 60/731,274 US, filed on Oct. 31, 2005, under the same assignee as the present application.

According to some embodiments of the present invention, the depth extraction module, 5050, may be adapted to extract depth from the acquired image.

According to some embodiments of the present invention, the system may be further adapted to project the skeleton onto the image, as shown in step 6450. According to some further embodiments of the present invention, the projection may be applied in the two-dimensional plane.

According to yet further embodiments of the present invention, the projection of the skeleton may be applied in the three-dimensional plane if module 5050 is used.

According to some embodiments of the present invention, the projection may be onto a three-dimensional image and/or a three dimensional cloud of points.

According to some embodiments of the present invention, the projection module, 6450, may be adapted to project the skeleton onto the image.

According to some embodiments of the present invention, the system may be further adapted to fit the segmented data with the projected skeleton, as shown in step 6500. According to some further embodiments of the present invention, the fitting process may comprise the association of portions of the segmented data with portions of the projected skeleton.

According to some embodiments of the present invention, fitting the segmented data may comprise associating portions of the extracted segmented data with current skeleton parameters, which current skeleton parameters may support the associated portions of extracted segmented data.

According to some further embodiments of the present invention, the outcome of this process is a "fitted skeleton".

According to some further embodiments of the present invention, the fitting module, 5500, may be adapted to associate the segmented data with the projected skeleton.

According to some embodiments of the present invention, the system may be further adapted to give a score to the fitted skeleton and detect errors, as shown in step 6550. According to some embodiments of the present invention, giving score and detecting errors may comprise: (1) examining the fitted skeleton, (2) evaluating the fitting quality of said skeleton and (3) determining whether an error has occurred during the skeleton prediction process or the association of segmented data.

According to some embodiments of the present invention, the scoring and error detection module, 5550, may be adapted to give scores and detect errors.

According to some embodiments of the present invention, if an error was detected during step 6550, the system may enter a recovery phase, as shown in step 6600. The recovery process may be a process of multiple processing layers.

According to some embodiments of the present invention, the recovery phase may comprise re-segmenting the image, re-predicting the 3D skeleton position, re-projecting and re-fitting the skeleton using extended effort. According to yet further embodiments of the present invention, the recovery module may also decide to skip a frame or more if the image information is corrupt.

According to some embodiments of the present invention, during recovery the system may be adapted to detect that the object it is tracking is not in the frame. According to yet further embodiments of the present invention, the system may be adapted to skip one or more frames until the object is back in the frame.

According to yet further embodiments of the present invention, the recovery phase may direct the system back to the initialization step.

According to some embodiments of the present invention, the recovery module 5600 may be adapted to perform the recovery process.

According to some embodiments of the present invention, if no error was detected during step 6550, the system may be adapted to update the position of the three dimensional skeleton in accordance with the position of the fitted skeleton, as shown in step 6700. According to some further embodiments of the present invention, the updating process may comprise: (1) projecting the 3D skeleton onto the fitted skeleton, (2) associating the three dimensional skeleton with the fitted skeleton, (3) extract depth using the Zlens assembly, (4) associating the three-dimensional skeleton with depth parameters and (5) updating the position of the 3D skeleton.

According to some embodiments of the present invention, the three dimensional correlation module, 5700, may be adapted to update the position of the three dimensional skeleton.

According to some embodiments of the present invention, the three-dimensional correlation module 5700 and the skeleton prediction module 5800, may use some or all of the algorithms and processes which were disclosed in PCT application serial number PCT/IL2005/000813, filed on 31 Jul. 2005, under the same assignee as the present application.

According to some further embodiments of the present invention, the functionality of (1) the three-dimensional correlation module 5700 (2) the Zlens image acquisition assembly 5000 the (3) depth extraction module 5050 and (4) particularly the extrapolation of depth from an image acquired using the Zlens apparatus may best be described in conjunction with PCT/IL2006/001254, filed on Oct. 31, 2006, under the same assignee as the present application and with U.S. Patent application 60/731,274 US, filed on Oct. 31, 2005, under the same assignee as the present application.

According to some embodiments of the present invention, the systems described hereinabove may be adapted to receive from an exterior source depth images and/or three-dimensional images. According to yet further embodiments of the present invention, if a depth images and/or three-dimensional images are received the system is adapted to extract its parameters in the relevant modules.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be appreciated that a variety of programming languages may be used to implement the teachings of the inventions as described herein. One of ordinary skill in the art should understand that the described invention may be used for all kinds of wireless or wire-line system.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A 3D human machine interface comprising:
    an image sensor to acquire a set of two-dimensional images of a user body from a single viewing angle, wherein substantially each image is associated with a different point in time; and
    a processing unit to: (1) derive estimated three dimensional coordinates of elements of the user body, during the acquisition of an image of the set, by correlating and fitting two dimensional projections of a three-dimensional data model of a template human body to appearances of the user within the set of two-dimensional images acquired by the image sensor, wherein the data model includes definitions of spatial relationships between elements of the model, which definitions are used to facilitate said correlating and fitting of the model to appearances of the user; (2) determine a movement of one or more body parts of the user during acquisition of the set of images, based on the estimated three dimensional coordinates of elements of the user body; and (3) transmit a signal representing a user input in response to the determined user body movement.

2. The 3D human machine interface according to claim 1, further comprising an image segmentation module for extracting segments of image data from images of the set of two-dimensional images of a user and correlating and fitting segments of the three dimensional data model to segments of appearances of the user within the extracted segments.

3. The 3D human machine interface according to claim 2, further comprising a scoring module for evaluating the quality of the correlations and fittings performed by the segmentation module.

4. The 3D human machine interface according to claim 1, further comprising a skeleton prediction module for predicting the position of the three dimensional data model.

5. The 3D human machine interface according to claim 1, wherein correlating and fitting two dimensional projections of a three-dimensional data model of a template human body includes scaling and distorting the model.

6. The 3D human machine interface according to claim 1, wherein the three-dimensional data model of a template human body includes spatial constraints between elements of the model, which spatial constraints are representative of spatial constraints of a human anatomy, and said constraints are used for facilitating correlating and fitting the model to appearances of the user within the set of two-dimensional images.

7. The 3D human machine interface according to claim 1, wherein said image sensor is a web camera.

8. A 3D human machine interface comprising:
an image sensor to acquire a series of two-dimensional images of a human user body, from a single viewing angle, wherein substantially each image is associated with a different point in time;
a processing unit to: (1) derive estimated three dimensional coordinates of elements of the user body, during the acquisition of an image of the series, by correlating and fitting two dimensional projections of a three-dimensional data model of a template human body to appearances of the user within the series of two-dimensional images acquired by the image sensor, wherein the data model includes definitions of spatial relationships between elements of the model, which definitions are used to facilitate said correlating and fitting of the model to appearances of the user;
which (2) determine one or more estimated body movements of the human user during acquisition of the series of images, based on the estimated three dimensional coordinates of elements of the user body; and
an output module which outputs user input signals to a computing platform based on the determined body movements.

9. The 3D human machine interface according to claim 8, wherein correlating and fitting two dimensional projections of a three-dimensional data model of a template human body includes scaling and distorting the model.

10. The 3D human machine interface according to claim 8, further comprising a segmentation module for extracting segmented data from the image and correlating and fitting segments of the data model of a template human body to appearances of the user within the segmented data.

11. The 3D human machine interface according to claim 9, further comprising a scoring module for evaluating the quality of the correlations and fittings performed by the segmentation module.

12. The 3D human machine interface according to claim 8, further comprising a skeleton prediction module for predicting the position of the three dimensional data model.

13. The 3D human machine interface according to claim 8, wherein the three-dimensional data model of a template human body includes spatial constraints between elements of the model, which spatial constraints are representative of spatial constraints of a human anatomy, and said constraints are used for facilitating correlating and fitting the model to appearances of the user within the series of two-dimensional images.

14. The 3D human machine interface according to claim 8, further comprising a scoring module for evaluating the quality of the correlations and fittings of a data model of a template human body to appearances of the user within the series of two-dimensional images acquired by the image sensor.

15. A method for 3D human machine interfacing comprising:
acquiring, by an image sensor, a series of two-dimensional images of a human user body, from a single viewing angle, wherein substantially each image is associated with a different point in time;
Deriving, by use of processing circuitry, estimated three dimensional coordinates of elements of the user body, during the acquisition of an image of the series, by correlating and fitting, by the processing circuitry, two dimensional projections of a three-dimensional data model of a template human body to appearances of the user within the series of two-dimensional images acquired by the image sensor, wherein the data model includes definitions of spatial relationships between elements of the model, which definitions are used to facilitate said correlating and fitting of the model to appearances of the user;
Determining, by use of the processing circuitry, a movement of one or more body parts of the user during acquisition of the series of images, based on the estimated three dimensional coordinates of elements of the user body; and transmitting user input signals to a computing platform based on the determined movement of one or more body parts of the user.

16. The method according to claim 15, wherein correlating and fitting a three dimensional data model of a template human body to appearances of the user within the series of two-dimensional images acquired by the image sensor includes scaling and distorting the model.

17. The method according to claim 15, further comprising extracting segments of image data from images of the series of two-dimensional images of a user and correlating and fitting segments of the three dimensional data model to segments of appearances of the user within the extracted segments, wherein correlating and fitting segments of a three-dimensional data model of a template human body includes comparing segments of two dimensional projections of the data model with segments of appearances of the user within the series of two-dimensional images.

18. The method according to claim 15, further comprising evaluating the quality of the correlations and fittings of a data model of a template human body to appearances of the user within the series of two-dimensional images acquired by the image sensor.

19. The method according to claim 15, wherein the three-dimensional data model of a template human body includes spatial constraints between elements of the model, which spatial constraints are representative of spatial constraints of a human anatomy, and said constraints are used for facilitating correlating and fitting the model to appearances of the user within the series of two-dimensional images.

* * * * *